Nov. 7, 1967  E. J. RAPOZA  3,350,949
ELECTROMECHANICAL ACTUATION APPARATUS
Filed July 28, 1965  2 Sheets-Sheet 1

INVENTOR.
EDWARD J. RAPOZA
BY
Constantine A. Michalos
ATTORNEY

Nov. 7, 1967   E. J. RAPOZA   3,350,949
ELECTROMECHANICAL ACTUATION APPARATUS
Filed July 28, 1965   2 Sheets-Sheet 2
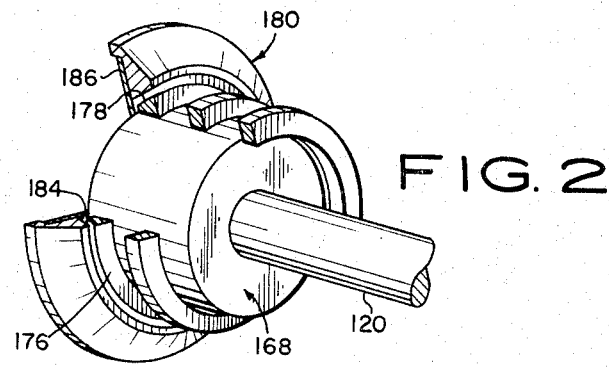
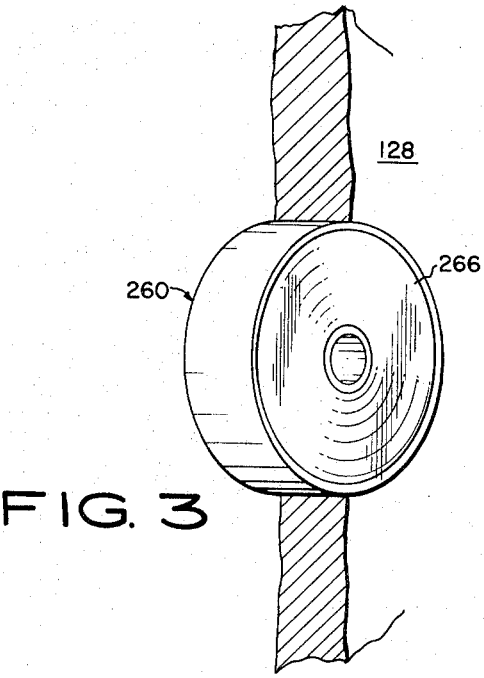
INVENTOR.
EDWARD J. RAPOZA
BY
Constantine A. Michalos
ATTORNEY United States Patent Office 3,350,949
Patented Nov. 7, 1967

3,350,949
ELECTROMECHANICAL ACTUATION
APPARATUS
Edward J. Rapoza, Butler, N.J., assignor to General Precision Inc., Little Falls, N.J., a corporation of Delaware
Filed July 28, 1965, Ser. No. 475,605
10 Claims. (Cl. 74—127)

ABSTRACT OF THE DISCLOSURE

An electromechanical actuation system having a motor supporting a shaft for rotation continuously in one direction, driving a gear means which include a pair of opposed substantially identical driven means having in-line and spaced coaxially extending driven shafts. Each shaft in turn supporting a clutch system having a rotor and a stator by means of a frustro-conical sleeve or collar.

With this construction one or the other clutch will be engaged depending upon the signal received for movement of the frusto-conical sleeve, attached thereto, in either one or the other direction, which direction is longitudinally parallel to the longitudinal axis of the clutch and shafts. In this manner there can be provided a reciprocating actuator having either: a forward drive; a reversed drive; and, a normal position in which the actuator is not moving while the motor is continuously rotating in one direction.

---

The present invention relates to fast-response actuation systems and particularly to an electromechanical actuation system having an apparatus with a reciprocating actuator.

A prior-art fast-response actuation apparatus of the hydraulic type is described in U.S. Patents Nos. 3,163,093 and 3,158,071, which are assigned to the same assignee as this invention. One problem with the hydraulic type of actuation apparatus is that its sealing members can leak thereby seriously hampering effective performance.

In accordance with one embodiment of the present invention, an electromechanical type of fast-response actuation apparatus with a reciprocating actuator is provided rather than a hydraulic type of apparatus.

Accordingly, it is one object of the invention to provide a fast-response actuation system having an electromechanical actuation apparatus with a reciprocating actuator.

It is another object of the invention to provide an electromechanical actuation apparatus for the aforementioned system having a forward drive means, a forward-reverse driven means and an interconnecting non-coasting shiftable coupling means.

It is a further object of the invention to provide a fast-response coupling means for the aforementioned actuator having a forward-drive clutch means and a separate reverse-drive clutch means.

It is a still further object of the invention to provide a combination brake-clutch type of clutch means for the aforementioned coupling means.

To the fulfillment of these and other objects, the invention provides an electromechanical actuation apparatus comprising a rotating drive means, a reversibly-displacing driven means, and a fast-response forward-reverse shiftable coupling means interconnecting said drive means to said driven means.

Other objects of the invention will become apparent upon reading the annexed detailed description in connection with the drawings wherein like parts are designated by like numerals throughout the several views, and wherein:

FIG. 2 is a perspective view, partially in section, showing an element of the invention of FIG. 1, in detail; and, FIG. 3 is a perspective view, partially in section of another element of the invention.

Figure 1:
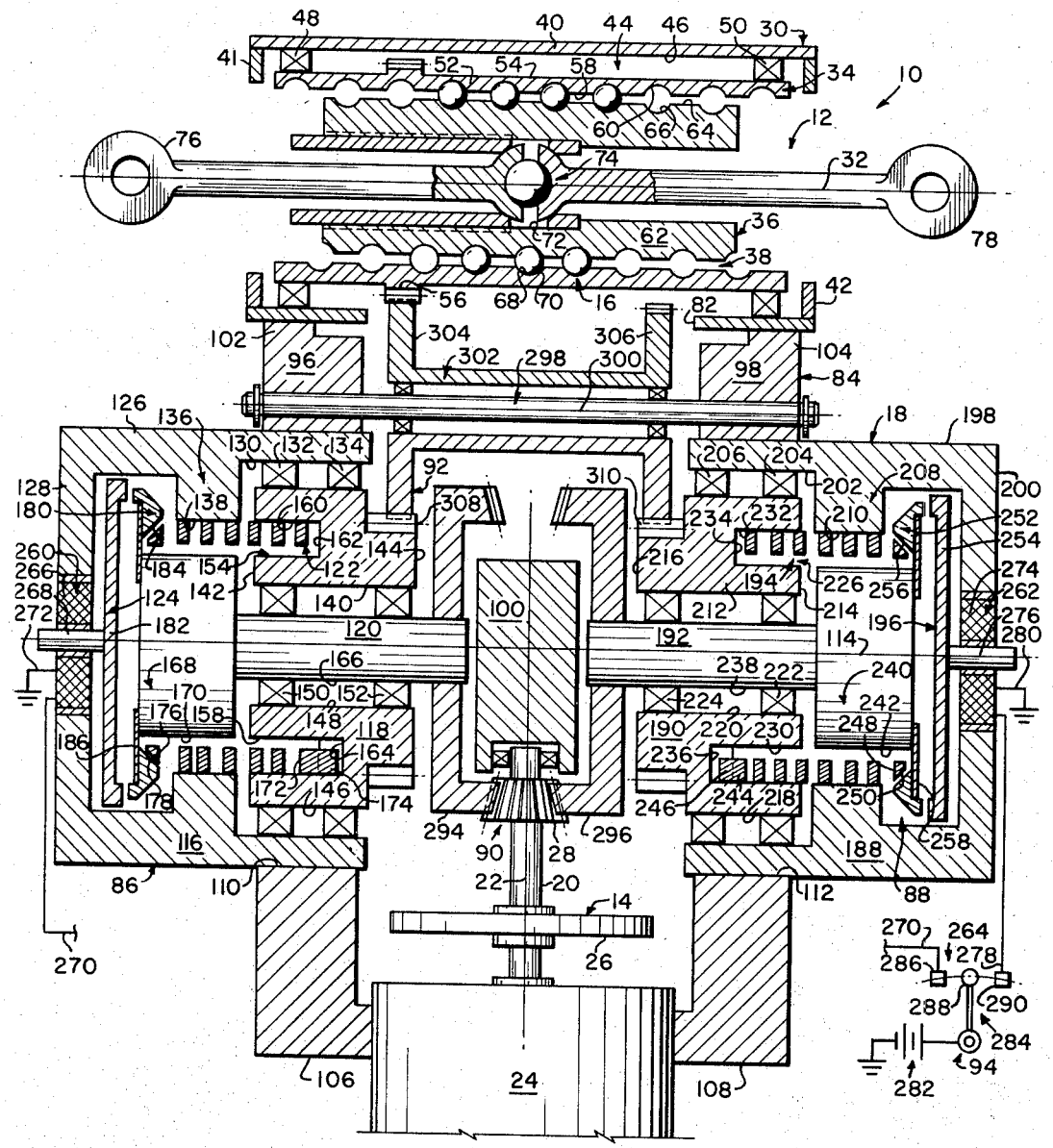
FIG. 1 is a sectional view of an actuation apparatus embodying features of the present invention.

Referring to FIGS. 1 to 3, one embodiment of the present invention comprises a fast-response actuation system 10, which has an electromechanical actuation apparatus 12. Apparatus 12 comprises a rotating drive means 14, a reversibly-displacing driven means or actuator 16 and a fast-response forward-reverse shiftable coupling means 18.

Drive means 14 includes a drive shaft 20 with a shaft axis 22 and a motor 24, which connects to one end of shaft 20 coaxially therewith. Motor 24, which is preferably designed or sized to provide an average power level over a full duty cycle, has a flywheel 26, that is coaxially mounted on shaft 20. Shaft 20 has a pinion gear 28 for connection to coupling means 18.

Driven means 16, which is a reciprocating actuator, includes a housing or outer body 30 with an axis 32, a cylinder or middle body 34, which is journaled in housing 30 for rotation about axis 32 relative thereto, and a piston or inner body 36, which is enclosed by cylinder 34 coaxially therewith for reversible displacement along axis 32 relative to cylinder 34 and housing 30. Driven means 16 also has a ball-screw converter or jackscrew connection 38. Jackscrew 38 is disposed between piston 36 and cylinder 34.

Housing 30 has a peripheral wall 40 and a pair of axially-spaced end walls 41, 42 forming a cavity 44. Wall 40 has a radially-inner surface 46 with a pair of axially-spaced ball bearing units 48, 50 fitted therein.

Cylinder 34 also has a peripheral wall 52, which is journaled in bearings 48, 50 coaxially therewith for rotation of cylinder 34. Wall 52 has a radially-outer surface 54 with an integral ring gear 56 mounted thereon. Gear 56 faces in a radially-outward direction for connection to coupling means 18. Wall 52 also has a radially-inner surface 58, which has a helically-shaped, inwardly-facing groove 60 of semicircular cross-section.

Piston 36 has a peripheral wall 62 with a radially-outer surface 64, which has a similar matching outwardly-facing helically-shaped groove 66 facing groove 60 thereby forming a helically-shaped ball bearing race 68.

Jackscrew connection 38, which is disposed between surface 64 and surface 58 for interconnection therebetween, includes a plurality of bearing balls 70 that are received in race 68.

Piston 36 also has a radially-inner surface 72 with a pivot bearing means 74, which is fixedly connected to and fitted into surface 72. Piston 36 also has a pair of thrust links 76, 78, which are supported from pivot 74 and which extend in an axially-outward direction therefrom. With this construction, clockwise and counter-clockwise rotation of ring gear 56 rotates cylinder 34 relative to housing 30 thereby causing piston 36 to displace in forward and reverse directions along axis 32. Piston 36 also has a coaxial integral ring gear 80, which is mounted on surface 64 and which faces in a radially-outward direction. Housing 30 also has an opening or cut-out 82 which is opposite to gear 80 for ease of connection to coupling means 18.

Coupling means 18, which is similar to a transmission assembly or a clutch assembly, comprises a support structure 84, a forward-drive clutch unit 86, a reverse-drive clutch unit 88, a common input gear means 90, which interconnects clutches 86, 88 to drive means 14, a common output gear means 92, which interconnects clutches 86, 88 to driven means 16, and a common clutch control means 94.

Structure 84, which is symmetrically disposed about axis 22, includes a pair of parallel sidewalls 96, 98 and a small pedestal wall 100, which is disposed between sidewalls 96, 98 parallel thereto. Sidewalls 96, 98 respectively have a pair of wall portions or brackets 102, 104 at one end thereof for support of actuator 16. Sidewalls 96, 98 respectively have another pair of brackets 106, 108 at the other end thereof for support of motor 24 therefrom. Sidewalls 96, 98 also have respective openings 110, 112, which extend therethrough and which receive clutches 86, 88 respectively.

Clutches 86, 88 are non-coasting or non-free-wheeling type clutches, and are identical in construction, and have a common transverse clutch axis 114, that intersects axis 22 substantially at right angles thereto. Clutches 86, 88 are disposed in face-to-face arrangement, symmetrically about axis 22 on either side thereof. In addition clutch 86 functions as a forward brake; and clutch 88 also functions as a reverse brake.

Clutch 86 comprises a fixed body 116, an output body 118, an input body 120, a spring means or wrap spring 122, which alternately couples output body 118 to input body 120 for forward driving, or couples output body 118 to fixed body 116 for forward braking, and a spring activator 124 for alternating the coupling action of spring 122.

Fixed body 116, which is an outer casing, has a peripheral wall 126 of cylindrical shape, which has an end wall 128 that closes its axially outer end. Wall 126 has a radially-inner surface 130 with a pair of axially-spaced outer ball-bearing units 132, 134. Wall 126 also has an inner shoulder portion 136 with a cylindrical radially-inner surface portion 138.

Output body 118, which is a hollow sleeve that is journaled in fixed body 116, has a peripheral wall 140 of cylindrical shape with a pair of axially-spaced, axially-outwardly-facing end faces 142, 144. Wall 140 has a cylindrical radially-outer surface 146, which fits inside outer bearings 132, 134. Wall 140 also has a radially-inner surface 148 with a pair of axially-spaced inner ball-bearing units 150, 152.

End face 142 has an annular recess 154, which receives said helical-coil wrap-spring 122. Recess 154 has a radially-inner sidewall or face 158 of cylindrical shape and a radially-outer sidewall or face 160 of cylindrical shape. Sidewalls 158, 160 are concentric about clutch axis 114. Sidewall 160 has substantially the same inner diameter as surface 138. Recess 154 also has a bottom wall 162 with a groove or notch 164 therein.

Input body 120, which is a solid shaft that is journaled in output body 118, has a cylindrical radially-outer surface 166, which fits inside inner bearings 150, 152. Input body 120 has an outer shoulder portion 168, which is concentric about axis 114. Shoulder 168 has a cylindrical radially-outer surface portion 170 of substantially the same outer diameter as inner sidewall 158.

Wrap spring 122, which is a coil spring that is made of wire of rectangular cross-section and that is wound in a plurality of turns in a helical shape, normally has a substantially-constant outer diameter. Wrap spring 122 has an axially-inner coil turn 172, which is adjacent to bottom wall 162 and which has a return bend portion 174 that is received in notch 164. In this way, spring 122 is fixedly connected to output body 118. Spring 122 also has an axially-outer coil turn 176, which has a chamfered or conical surface or edge 178 that faces in a radially-outward and axially-outward direction.

Spring activator 124, which is self-activated by clutch control 94, comprises a frustro-conical sleeve or collar 180 one of which is shown in detail in FIGURE 2 for coupling spring 122 to input body 120 when urged thereagainst, and for releasing spring 122 from input body 120 when displaced therefrom, and a piston 182, which has a cup-like shape, for urging collar 180 in an axially-inward direction against adjacent coil turn 176.

Collar 180 has a radially-inner surface 184 of frustroconical shape facing in an axially-inward direction. When activated by control 94, surface 184 engages edge 178 and collar 180 urges coil turn 176 in a radially-inward direction for frictional engagement of turn 176 with surface 166 whereby spring 122 is coupled to input body 120. Collar 180 also has a spring means 186, which is connected to input body 120 for support of collar 180 therefrom. Spring 186 urges collar 180 in an axially-outward direction. When collar 180 is displaced axially-outwardly and away from turn 176, wrap spring 122 expands to its original size or normal diameter due to its potential energy. In this way input body 120 is disengaged from output body 118, and input body 120 can continue to rotate in an unloaded condition.

With this construction of clutch 86, effective design parameters are provided, including a ratio of actuating force to output force that is minimized and including a clutching time delay measurement that is also minimized. Thus, clutch 86 assures a fast-response type of operation.

Clutch unit 88 similarly comprises a fixed body 188, an output body 190, an input body 192, a wrap spring 194, and an activator 196. Fixed body 188 similarly has a peripheral wall 198 and an end wall 200. Wall 198 has a radially-inner surface 202 with a pair of bearings 204, 206, and has an inner shoulder 208 with a radially-inner surface portion 210.

Output body 190 similarly has a peripheral wall 212 with a pair of end faces 214, 216. Wall 212 has a radially-outer surface 218 and a radially-inner surface 220 with a pair of bearings 222, 224. Face 214 has a recess 226 receiving said wrap spring 194. Recess 226 has an inner sidewall or face 230, an outer sidewall or face 232 that has substantially the same inner diameter as surface 210. Recess 226 also has a bottom wall 234 with a notch 236.

Input body 192 similarly has a radially-outer surface 238 and also has an outer shoulder 240 with a radially-outer surface portion 242 of substantially the same outside diameter as sidewall 230.

Wrap spring 194 similarly has an inner coil turn 244 received in recess 226 with a return bend 246 received in notch 236, and has an outer turn 248 with a conical edge 250.

Activator 196 similarly has a collar 252 and a piston 254. Collar 252 has a radially-inner surface 256 and a spring means 258.

Clutch control 94 includes a pair of control portions or solenoids 260, 262, one of which is shown in detail in FIGURE 3, which are respectively mounted on clutches 86, 88. Control 94 also has a common circuit 264 connecting to solenoids 260, 262.

Solenoid 260 is comprised of a field winding or stator 266 and a piston rod 268. Winding 266 surrounds rod 268 coaxially therewith for relative axial displacement therebetween. Rod 268 is fixedly connected to piston 182 coaxially therewith for urging piston 182 against collar 180. Winding 266 has an input lead 270 and a ground lead 272.

Solenoid 262 similarly has a field winding or stator 274 and a piston rod 276, which is connected to its piston 254. Solenoid 262 also has an input lead 278 and a ground lead 280.

Circuit 264 has a power source 282 and a three-position switch means 284. Switch 284 has a forward drive position 286, an open neutral position 288 and a reverse-drive position 290. At position 286, solenoid 260 is energized and solenoid 262 is de-energized. At position 288, both solenoids 260, 262 are de-energized for shutdown. At position 290, solenoid 262 is energized and solenoid 260 is de-energized. With this construction, a safety interlock is provided between solenoids 260 and 262 and also between activators 124 and 196 thereby preventing a simultaneous energization of respective clutches 86, 88.

Input gearing 90, which is a common input connection to clutches 86, 88 from gear 28, includes a pair of oppositely-facing, coaxial, axially-spaced, face or bevel gears 294, 296, which respectively mesh with gear 28. Gear 294 is integrally connected to input shaft 120 coaxially therewith; and gear 296 is integrally connected to input shaft 192 coaxially therewith.

Output gearing 92, which is a common output connection from clutches 86, 88 to cylinder 34, includes a gear shaft 298 with an axis 300, and an idler gear 302 that is journaled on shaft 298. Idler 302 has a pair of axially-spaced gear rings 304, 306 integral therewith. Gear shaft 298 is mounted in walls 96, 98. Gear rings 304, 306 have respectively-meshing output or ring gears 308, 310. Gear 308 is integrally connected to output body 118 coaxially therewith; and gear 310 is integrally connected to output body 190 coaxially therewith.

In operation, the system load power, which is provided by motor 24, includes three main power portions, as follows:

(1) The power used to radially deflect or contract clutch springs 122, 194. In one test model of embodiment 10, said spring power level was about 12 watts.

(2) The acceleration power used to accelerate driven means 16. Said acceleration power is provided in bursts or steps of acceleration. In the aforementioned test model of embodiment 10, output gear 92 received about 30–60 acceleration bursts during a time interval within which gear 92 accelerated from 0–300 degrees per second rotary speed. In said model above, the acceleration power level was about 220 watts.

(3) The clutch overrunning power consumed by one clutch 86 or 88, which has a frictional-drag overrun condition during the time the opposite clutch 88 or 86 is in a driving condition. The clutch overrunning power level for the above-mentioned test model of embodiment 10 was about 14 watts.

With the construction of embodiment 10, certain advantages are provided as follows:

(1) Coasting or free-wheeling of output gearing 92 and actuator 16 is minimized during forward-drive condition and during reverse-drive condition.

(2) Shock loading, deadband range and backlash of coupling means 18 during a reversal of actuator 16 is minimized. In embodiment 10, clutch 86 or 88 brakes and decelerates output gearing 92 before the opposite clutch 88 or 86 applies its reverse drive power.

(3) Coupling means 18 provides a safety lock for neutral position 288 at shutdown condition by interlocking output gearing 92 to structure 84.

(4) The ratio of friction-heat power level to total system power level is also minimized.

(5) Full drive torque is transmitted through coupling means 18 on each engagement of either clutch 86, 88.

(6) Accurate positioning of thrust links 76, 78 because coupling means 18 has an extremely fast transient response to a step input to achieve a full rated speed. In one test model of embodiment 10, the transient response was 0.002 second to reach a full rated rotary speed of 300 degrees per second in gearing 92.

(7) The ratio of size of coupling means 18 to its torque capability is also minimized.

In summary, embodiment 10 provides a fast-response actuation system having an electromechanical actuation apparatus with a reciprocating actuator, said apparatus having a forward drive means, a forward-reverse driven means and an interconnecting non-coasting shiftable coupling means. Thus, the invention provides an electromechanical system, which eliminates the many conventional problems inherent in a hydraulic system.

While the present invention has been described in a preferred embodiment, it will be obvious to those skilled in the art that various modifications can be made therein within the scope of the invention. As a first example, clutch control 94 can be a single manual lever with a pair of coaxial axially-spaced opposite-hand gear faces respectively engaging clutch piston 182 and clutch piston 254. As a second example, in clutch 86, input body 120 can be fixedly connected to structure 84, and fixed body 116 can rotate relative to structure 84 and can function as the clutch input member. As still another example, in clutch 86, wrap spring 122 could have a non-activated, normal position in which it couples input body 120 to output body 118, and could also have an activated energized position in which it couples fixed body 116 to output body 118. It is intended that the appended claims cover all such modifications.

What is claimed is:

1. An electromechanical actuation apparatus comprising: a uni-directional drive means; a reciprocating axial-displaceable driven means; and a fast-response forward-reverse shiftable coupling means interconnecting said drive means to said driven means in which said drive means includes an electric motor with a continuously-rotating drive shaft, and a flywheel connected coaxially thereto in order to minimize speed variations.

2. An electromechanical actuation apparatus comprising: a uni-directional drive means; a reciprocating axial-displaceable driven means; and, a fast-response forward-reverse shiftable coupling means interconnecting said drive means to said driven means in which said drive means includes an electric motor with a continuously-rotating drive shaft, and said driven means is a jackscrew actuator comprising a housing with an elongate axis; a cylinder coaxially journaled in said housing for rotation relative thereto about said axis; and a piston coaxially received within said cylinder and reversibly displaceable along said axis relative thereto and further, in which said actuator has at least one thrust link having a universal-joint pivotal-bearing means at its axially-inner end connecting to said piston whereby the axially-outer end of said thrust link can trace an arcuate path during its displacement.

3. A fast-response coupling means comprising: a pair of identical clutches including a clockwise rotary clutch and a counter-clockwise rotary clutch; a pair of gear means including a common continuously-rotating uni-directional input gear means connecting to said clutches and a common bi-directional output gear means connecting to said clutches; a support structure on which said pair of clutches and said pair of gear means are mounted; and, a single control means having a pair of alternately-actuating control portions respectively connecting to said clockwise clutch and to said counter-clockwise clutch in which said output gear means further comprises:

an idler gear for providing clockwise and counter-clockwise rotation having axially-spaced gear ring portions with one gear ring engaging said clockwise clutch and with said other gear ring engaging said counter-clockwise clutch.

4. A spring clutch comprising: a fixed body, an output body, an input body, a helical spring, and a spring activator means to couple said output body to said input body for driving action or to couple said output body to said fixed body for braking action in which said input body is a solid shaft and in which said output body is a hollow sleeve.

5. A spring clutch comprising: a fixed body, an output body, an input body, a helical spring, and a spring activator means to couple said output body to said input body for driving action or to couple said output body to said fixed body for braking action in which said input body has a coaxial drive gear and said output body has a coaxial driven gear which is disposed adjacent to said input drive gear.

6. A spring clutch comprising: a fixed body, an output body, an input body, a helical spring, and a spring activator means to couple said output body to said input body for driving action or to couple said output body to said fixed body for braking action in which said input body has a connecting motor with a rotor geared to said input body and a stator fixedly connected to said fixed body.

7. A spring clutch comprising: a fixed body, an output body, an input body, a helical spring, and a spring activator means to couple said output body to said input body for driving action or to couple said output body to said fixed body for braking action in which said activator includes a frusto-conical sleeve disposed in partly overlapping arrangement with said helical spring and being axially displaceable relative thereto along a common axis for urging said spring against said input body.

8. A spring clutch comprising: a fixed body, an output body, an input body, a helical spring, and a spring activator means to couple said output body to said input body for driving action or to couple said output body to said fixed body for braking action in which said output body is a hollow shaft of cylindrical shape having a pair of axially-spaced end faces with one of said end faces having a circular recess for receiving one end of said helical spring, said recess having a radially-inner sidewall and also a radially-outer sidewall.

9. A clutch as claimed in claim 8, in which said input body is a solid shaft coaxially journaled in said output body having a radially-outwardly-projecting shoulder adjacent said recess with a radially-outer surface of substantially the same diameter as said inner sidewall.

10. A clutch as claimed in claim 8, in which said fixed body is a hollow bearing in which said output body is journaled coaxially therewith having a radially-inwardly-projecting shoulder adjacent said recess with a radially-inner surface of substantially the same diameter as said recess outer sidewall.

References Cited

UNITED STATES PATENTS

| | | | |
|---|---|---|---|
| 1,061,190 | 5/1913 | Lender | 74—378 |
| 2,462,393 | 2/1949 | Haynes | 192—51 |
| 2,487,280 | 11/1949 | Starkey | 192—51 |
| 2,660,029 | 11/1953 | Geyer | 74—424.8 |

FRED C. MATTERN, Jr., *Primary Examiner.*

W. S. RATLIFF, *Assistant Examiner.*